United States Patent [19]
Banker

[11] Patent Number: 5,213,904
[45] Date of Patent: * May 25, 1993

[54] ALUMINUM/STEEL TRANSITION JOINT

[75] Inventor: John G. Banker, Boulder, Colo.

[73] Assignee: Explosive Fabricators, Inc., Colo.

[*] Notice: The portion of the term of this patent subsequent to Mar. 2, 2010 has been disclaimed.

[21] Appl. No.: 788,087

[22] Filed: Nov. 5, 1991

[51] Int. Cl.$^5$ .............................................. B32B 15/20
[52] U.S. Cl. ................................... 428/651; 428/660; 428/677; 428/940
[58] Field of Search ............... 428/660, 677, 679, 651, 428/654, 940; 228/107

[56] References Cited

U.S. PATENT DOCUMENTS

| | | | |
|---|---|---|---|
| 3,583,062 | 6/1971 | Sharp et al. | 228/108 |
| 3,630,694 | 12/1971 | Earight et al. | 228/107 |
| 3,689,232 | 9/1972 | Baba et al. | 428/651 |
| 3,798,011 | 3/1974 | Sharp | 428/651 |
| 4,010,965 | 3/1977 | Izuma et al. | 228/107 |
| 4,612,259 | 9/1986 | Ueda | 228/107 |
| 4,756,464 | 7/1988 | Hardwick | 228/107 |

FOREIGN PATENT DOCUMENTS

| | | | |
|---|---|---|---|
| 49-15333 | 4/1974 | Japan | 228/107 |
| 1-313193 | 12/1989 | Japan | 228/107 |

Primary Examiner—John Zimmerman
Attorney, Agent, or Firm—Richard W. Hanes

[57] ABSTRACT

A five-layered bonded metal product comprising a top layer of aluminum alloy, a second layer of aluminum, a third layer of titanium, a fourth layer of 70-30 copper-nickel, and a fifth layer of steel. The method of producing said multi-layered product comprises the step of explosive bonding. The invention also includes a transition joint between aluminum and steel comprising interlayers of titanium and copper-nickel.

3 Claims, 1 Drawing Sheet

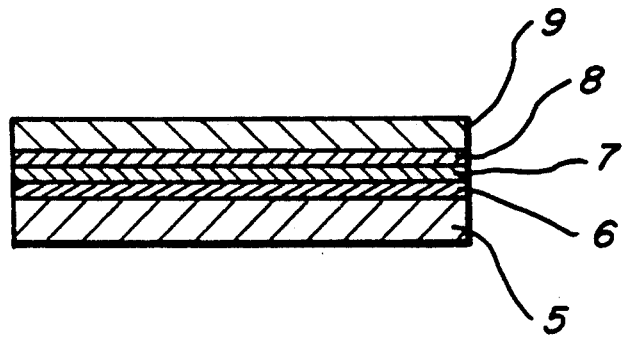
Fig_1
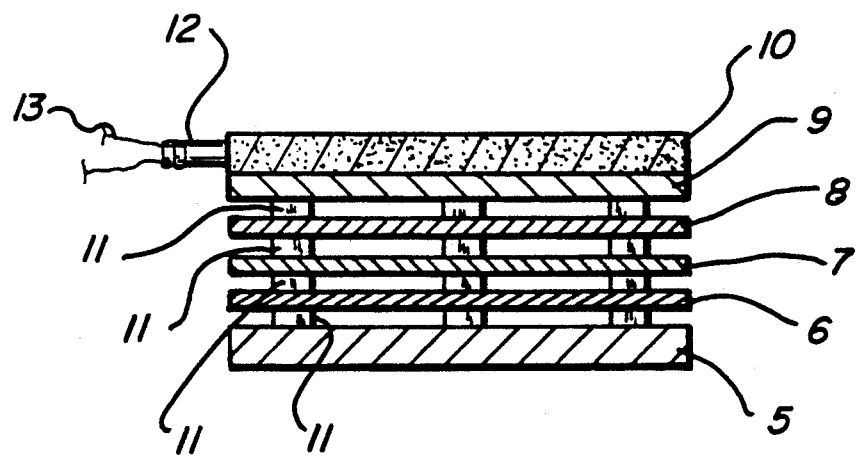
Fig_2

ALUMINUM/STEEL TRANSITION JOINT

BACKGROUND OF THE INVENTION

The invention relates to an aluminum/steel transition joint and the method of making the resultant composite metal using an explosive force.

In the past, aluminum and steel have been directly bonded together by explosion techniques to form aluminum/steel joints. U.S. Pat. No. 3,583,062, to Sharp et al. generally discloses explosion bonding techniques for bonding aluminum to steel. Transition joints created with the explosive bonding process are necessary for the welding together of these metals due to the metallurgical incompatibility of aluminum and steel when using fusion welding techniques. Such transition joints are essential in the shipbuilding industry in order to join aluminum structures to steel decks. These directly bonded transition joints between aluminum and steel are, however, subject to bond quality deterioration upon heating to temperatures above approximately 700° F., necessitating critical control of welding parameters during fabrication, frequently at the detriment of fabrication weld quality.

It is well known that interlayer metals between the aluminum and steel can reduce or eliminate the deterioration problem. U.S. Pat. No. 3,630,694 to T. J. Enricht discloses the use of a ferritic stainless steel interlayer to increase the deterioration threshold temperature by approximately 100° F. Titanium interlayers have been shown to increase the deterioration threshold to over 1000° F. The titanium-steel system, however, does not produce a tough bond. Thus, if sufficient stress is concentrated in the titanium/steel bond zone to initiate fracture, brittle catastrophic failure of the transition joint can occur. U.S. Pat. No. 4,612,259 to Ueda discloses the simultaneous use of two interlayers, first tantalum or niobium, and then copper, nickel, or copper-nickel, between titanium and steel to improve bond toughness of bonded and hot rolled clad. Both tantalum and niobium are very expensive and limit the practicality of the disclosed product.

It is therefore the object of the present invention to provide an improved aluminum/steel transition joint comprising interlayers of both titanium and copper-nickel to achieve a durable bond with thermal stability and superior strength.

It is a further object of the instant invention to provide a method for forming an improved aluminum/steel transition joint utilizing explosive force.

SUMMARY OF THE INVENTION

The invention relates to an improved aluminum steel transition joint consisting of a composite five-layered metal. The top layer of the composite is of aluminum alloy, 5000 series, the second layer is of unalloyed aluminum, the third layer is titanium, the fourth layer is 70-30 copper-nickel, and the fifth layer is steel. The titanium/aluminum interface provides superior resistance to deterioration during welding while being tough and strong. The interface between titanium and copper-nickel is strong, tough and thermally stable. The interface between copper-nickel and steel is strong, tough and thermally stable.

BRIEF DESCRIPTION OF THE DRAWINGS

FIG. 1 is a cross-sectional view showing a five-layered composite product made in accordance with the instant invention.

FIG. 2 is a cross-sectional view illustrating a portion of the assembly used to make the five-layered composite product by explosion bonding.

DETAILED DESCRIPTION OF THE INVENTION

FIG. 1 is a partial cross-sectional view of an example composite metal having the transition joint of the invention. The composite metal comprises a bottom steel layer 5 which is weldable to a steel structure in use, such as to form a mechanical connection between aluminum superstructures and steel hulls in the marine industry. The next interlayer 6 forming the transition joint is of 70-30 copper-nickel (70% copper, 30% nickel) which provides a tough interface or bond between the titanium layer 7 and the steel layer 6. The titanium interlayer of the transition joint provides good thermal resistance to approximately 1000° F. Layer 8 is preferably of unalloyed aluminum which is thermally compatible with titanium and contributes ductility and impact resistance to the composite. The top layer 9 is an aluminum alloy of the 5000 series, readily weldable to other shipboard structural aluminum.

It is noted in the above example that the steel plate can be of any grade, or can be of a material readily compatible with steel, such as iron, nickel, or chromium based alloys, or combinations thereof, such as carbon steels, low alloy steels, stainless steels, and nickel alloys as determined by the use of the composite.

It is also noted that the percentage of nickel in copper-nickel interlayers can vary, although the optimum percentage is in a range from 10%-60%.

FIG. 2 illustrates the apparatus for performing the process for forming the composite metal. The copper-nickel interlayer 6 of the transition joint is placed on the steel plate 5. Spacers 11 are used to separate the layers 5 and 6. The titanium layer 7 of the transition joint is placed on copper-nickel layer 6 with spacers 11 therebetween. In the preferred example, the aluminum is in two layers, layer 8 of unalloyed aluminum, spaced over the titanium layer 7, and a top layer 9 of aluminum alloy spaced over layer 8.

Explosive material 10 is placed on top of layer 9 to clad or bond the metals together. The explosive material 10 is ignited by blasting cap 12. The force of the resulting explosion clads or bonds the metal layer together into a resultant composite product metal.

The spacers between the metal layers can be of various materials, which are well known to those experienced in the art. The metal layers can be arranged horizontally as shown or they can be set on end. The explosive material can be applied to the outer surface of either of the outermost layers. The five-layer composite may be formed in a single simultaneous bonding operation or in two, three or four sequential operations.

It is further noted that the thickness of the outermost layers and interlayers can be selected to achieve the desired end product and are not critical in the explosive bonding.

The explosion cladding process produces an electron sharing, metallurgical bond. Prior to bonding, the plate surfaces are polished to remove visual contamination. During bonding, immediately preceding the collision point, the extreme surface pressure created by the impact produces a jetting action which strips away remaining surface contaminants. The jet cleaning action is immediately followed by the collision, generating bonding pressures of several million psi. The bonding action is completed in less than a millisecond, not allowing time for heat transfer and deleterious melting. The atomically clean surfaces and very high pressures result in an electron sharing bond, metallurgically similar to a grain boundary. A wavy appearing bond zone, resulting from the high velocity, high pressure collision of the metal elements, is characteristic of the explosion bonded composite.

Many structural aluminum alloys can be bonded other than that given in the example, and the steel product can be varied to achieve the desired composite for the desired use. The unalloyed aluminum layer can also be omitted if ductility is not a concern.

Although the invention has been described with particular reference to explosive bonding, it is also noted that other well known methods of bonding, such as diffusion bonding and roll bonding, could also be used.

It is claimed:

1. An explosion bonded laminated metal product comprising:
   a first layer of steel;
   a second layer of copper-nickel adjacent said steel layer, said second layer of copper-nickel comprising copper in a range from 65% to 75% and nickel in a range from 35% to 25%;
   a third layer of titanium adjacent said layer of copper-nickel, and
   at least one layer of aluminum adjacent said titanium layer, wherein said bonded laminated metal product exhibits superior bond toughness.

2. The metal product of claim 1 comprising two layers of aluminum, including a layer of unalloyed aluminum adjacent said titanium layer, and a layer of aluminum alloy adjacent said unalloyed aluminum layer.

3. An explosion bonded laminated metal product consisting essentially of:
   a first layer of steel;
   a second layer of copper-nickel adjacent said steel layer, said second layer of copper-nickel consisting essentially of copper in a range from 65% to 75%, and nickel in a range from 35% to 25%;
   a third layer of titanium adjacent said layer of copper-nickel; and
   at least one layer of aluminum adjacent said titanium layer.

* * * * *